(12) United States Patent
Loetscher et al.

(10) Patent No.: US 10,550,821 B2
(45) Date of Patent: Feb. 4, 2020

(54) PELTON RUNNER

(71) Applicant: ANDRITZ Hydro GmbH, Vienna (AT)

(72) Inventors: Benno Loetscher, Inwil (CH); Pascal Isler, Beromuenster (CH); Stefan Lais, Bonstetten (CH)

(73) Assignee: ANDRITZ HYDRO GMBH, Vienna (AT)

( * ) Notice: Subject to any disclaimer, the term of this patent is extended or adjusted under 35 U.S.C. 154(b) by 195 days.

(21) Appl. No.: 15/433,172

(22) Filed: Feb. 15, 2017

(65) Prior Publication Data

US 2017/0241396 A1 Aug. 24, 2017

(30) Foreign Application Priority Data

Feb. 18, 2016 (AT) .............................. A 50110/2016

(51) Int. Cl.
*F03B 1/02* (2006.01)

(52) U.S. Cl.
CPC ............ *F03B 1/02* (2013.01); *F05B 2260/30* (2013.01)

(58) Field of Classification Search
CPC ...... Y02E 10/223; Y02P 70/525; F03B 3/128; F03B 1/00; F05B 2240/2411; F05B 2260/301; F05B 2260/3011; F01D 5/3053
USPC .......................................................... 416/2
See application file for complete search history.

(56) References Cited

U.S. PATENT DOCUMENTS

| | | | | |
|---|---|---|---|---|
| 391,523 A * | 10/1888 | Englebright | .............. | F03B 1/04 416/197 R |
| 417,865 A * | 12/1889 | Green | ....................... | F03B 1/04 416/197 R |
| 493,239 A * | 3/1893 | Berry | ....................... | F03B 1/04 416/197 R |
| 576,849 A * | 2/1897 | Hug | ......................... | F03B 1/02 416/197 R |
| 599,845 A * | 3/1898 | Jones | ....................... | F03B 1/02 416/197 R |

(Continued)

FOREIGN PATENT DOCUMENTS

| AT | 33591 B | 7/1908 |
|---|---|---|
| AT | 96298 B | 3/1924 |

(Continued)

OTHER PUBLICATIONS 0.625 to 0.03_Expansion Diam, 2,500 Lb 35939883—MSC (Year: 2019).*

(Continued)

*Primary Examiner* — David E Sosnowski
*Assistant Examiner* — Maranatha Boardman
(74) *Attorney, Agent, or Firm* — Nixon & Vanderhye P.C.

(57) ABSTRACT

A Pelton runner with a wheel disk and separately fabricated buckets (2), which may be cast or made from a solid block of material and secured detachably to the wheel disk (1), fastened by at least one screw (5) or at least one bolt. At least one screw or at least one bolt is designed as an expansion screw (5) or expansion bolt, where the expansion screw (5) or expansion bolt is subjected to controlled pre-stressing, and each bucket (2) has at least one expansion screw (5) or expansion bolt that is arranged perpendicular to the axis of rotation of the wheel disk (1) and secured to the wheel disk (1).

15 Claims, 7 Drawing Sheets

(56) References Cited

U.S. PATENT DOCUMENTS

| | | | | |
|---|---|---|---|---|
| 607,246 | A * | 7/1898 | Johnson | F03B 1/02 |
| | | | | 415/202 |
| 617,555 | A | 1/1899 | Blue | |
| 645,221 | A * | 3/1900 | Tutthill | F03B 7/003 |
| | | | | 416/197 B |
| 817,546 | A * | 4/1906 | Bush | F03B 1/04 |
| | | | | 416/135 |
| 924,544 | A * | 6/1909 | Eckart | F03B 1/02 |
| | | | | 416/197 B |
| 1,017,618 | A * | 2/1912 | Berry | F03B 1/04 |
| | | | | 415/202 |
| 1,361,467 | A | 12/1920 | Kincaid | |
| 1,458,943 | A * | 6/1923 | Stanley | F16C 33/18 |
| | | | | 138/96 R |
| 1,459,672 | A * | 6/1923 | Hutchinson | F03B 1/02 |
| | | | | 415/201 |
| 2,075,952 | A * | 4/1937 | McIntosh | F16B 13/066 |
| | | | | 411/53 |
| 2,900,863 | A * | 8/1959 | Maynard | F16B 13/0858 |
| | | | | 411/325 |
| 2,935,296 | A * | 5/1960 | Hockert | F01D 5/06 |
| | | | | 416/220 R |
| 2,953,348 | A * | 9/1960 | Leland | F01D 5/326 |
| | | | | 416/221 |
| 3,295,826 | A * | 1/1967 | Nickles | F01D 5/326 |
| | | | | 416/221 |
| 3,324,953 | A * | 6/1967 | Greenhill | F04D 29/36 |
| | | | | 416/220 A |
| 3,443,792 | A * | 5/1969 | Moss | F01D 5/187 |
| | | | | 416/241 B |
| 3,594,099 | A * | 7/1971 | Herbert | B63H 3/12 |
| | | | | 416/207 |
| 3,788,763 | A * | 1/1974 | Nickles | F01D 17/162 |
| | | | | 415/147 |
| 5,292,227 | A * | 3/1994 | Czachor | F01D 25/162 |
| | | | | 415/142 |
| 8,540,489 | B2 * | 9/2013 | Bouvet | F03B 1/02 |
| | | | | 415/202 |
| 9,175,571 | B2 * | 11/2015 | Floyd | F01D 5/284 |
| 9,488,058 | B2 * | 11/2016 | Jorgensen | F03B 1/02 |

FOREIGN PATENT DOCUMENTS

| | | | | |
|---|---|---|---|---|
| CH | | 111442 | 9/1925 | |
| EP | | 0 960 181 | 12/1999 | |
| FR | | 480562 | 8/1916 | |
| FR | | 570124 A * | 4/1924 | F03B 1/02 |
| GB | | 174768 | 2/1922 | |
| GB | | 583291 A * | 12/1946 | F03B 1/02 |
| JP | | 2012127333 A | 7/2012 | |
| WO | WO 98/31776 | | 7/1998 | |

OTHER PUBLICATIONS

Dowel—Wikipedia (Year: 2019).*
Expansion bolt—Google Search (Year: 2019).*
Expansion fastener—Google Search (Year: 2019).*
Expansion screw—Google Search (Year: 2019).*
FTI Fine Thread Form Industries (Year: 2019).*
Small and mini hydropower plants (Year: 2019).*
Socket Head Countersunk Screw M16 x 80mm in A2 Stainless—ISO 10642 (DIN 7991)—Westfield Fasteners Ltd (Year: 2019).*
Socket Shoulder Screws (Year: 2019).*
Search Report for EP 16205343 (dated Jul. 4, 2017).

* cited by examiner

PELTON RUNNER

RELATED APPLICATION

This application claims priority to Austrian Application No. A50110/2016 filed Feb. 18, 2016, the entirety of which is incorporated by reference.

BACKGROUND OF INVENTION

The invention relates to a Pelton runner with a wheel disk and separately fabricated buckets, which may be cast or made from a solid block of material and secured detachably to the wheel disk, fastened by at least one screw or at least one bolt.

There are several different processes for manufacturing Pelton runners. One laborious method is to form the Pelton buckets from a solid blank, causing approximately 60-70% of the material to be lost. In other processes for making Pelton turbines, such as HIWELD™, MICROGUSS™ and shown in EP 960181, buckets are welded onto suitably prepared wheel disks. In addition, a method is described in GB 174,768 and CH 111442, where individual buckets are secured to suitably shaped parts of a wheel disk by means of axial bolts. To be stable, the buckets must be provided with suitable extensions through which the bolts can be inserted, and the wheel disk must also have corresponding extensions.

The methods used so far are very laborious and cost-intensive as they require special designs of devices for welding or bolting on, among other things. Erosion damage to integrated Pelton runners, which are formed in a single piece or where the buckets are welded on using various methods, is usually repaired by welding and grinding down. This presents a substantial risk, especially in the high-stress zone at the base of the bucket because cracks, which then result in subsequent breaks, can begin here.

SUMMARY OF THE INVENTION

A simple and low-cost method of producing a Pelton runner has been invented and is disclosed herein, that also enables economical and safe maintenance.

The invention may be embodied as at least one expansion fastener, such as a screw or at least one bolt designed as an expansion screw or expansion bolt. The expansion fastener, e.g., expansion screw or expansion bolt, is subjected to controlled pre-stressing. Each bucket has at least one expansion fastener, e.g., screw or expansion bolt, that is arranged perpendicular to the axis of rotation of the wheel disk and secured to the wheel disk. As a result, both the wheel disk and the buckets can be produced very easily and at low cost.

The expansion fastener, e.g., expansion screw or the expansion bolt, may be pre-stressed in combination with a nut. As a result, the forces occurring due to rotation can be controlled particularly well without additional measures. The expansion screw or expansion bolt can be pre-stressed here to such an extent that there are no dynamic working forces acting on the expansion screw or expansion bolt as a result of the impact of the water jet, which would otherwise diminish their lifespan.

Each bucket may be joined in a form-locked connection to the wheel disk via at least one shear pin aligned in radial direction to the axis of rotation of the wheel disk and/or via other shear pins aligned in radial direction to the axis of rotation. As a result, the tangential forces from the water jets can be absorbed particularly well. Together with the pre-stressed screws, the dynamic loading of the screws can thus be maintained at a very low level, and the screws can be manufactured from low-cost material. The shear pins act as form-locking elements and can also relieve the dynamic forces acting on the screw joint in tangential direction.

The expansion screw or expansion bolt may direct the radial centrifugal forces and the shear pins direct the tangential jet forces into the wheel disk. As a result, the tangential and radial working forces can be introduced separately and the individual parts specially designed to deal with this load.

The expansion screw may have a cover at its free end. This protects it against abrasive water, thus extending its lifespan.

The expansion screw or expansion bolt may be screwed in from the inside, e.g. from the axial direction of the wheel disk. This provides particularly advantageous protection for the screw joint against the driving water.

Two or more buckets may be each combined to form one bucket unit and secured to the wheel disk by a single expansion screw. In this way, the number of parts to be mounted and the assembly time itself can be greatly reduced.

SUMMARY OF THE DRAWINGS

The invention will now be described in examples and referring to the drawings, where.

DETAILED DESCRIPTION OF THE INVENTION

Figure 1:
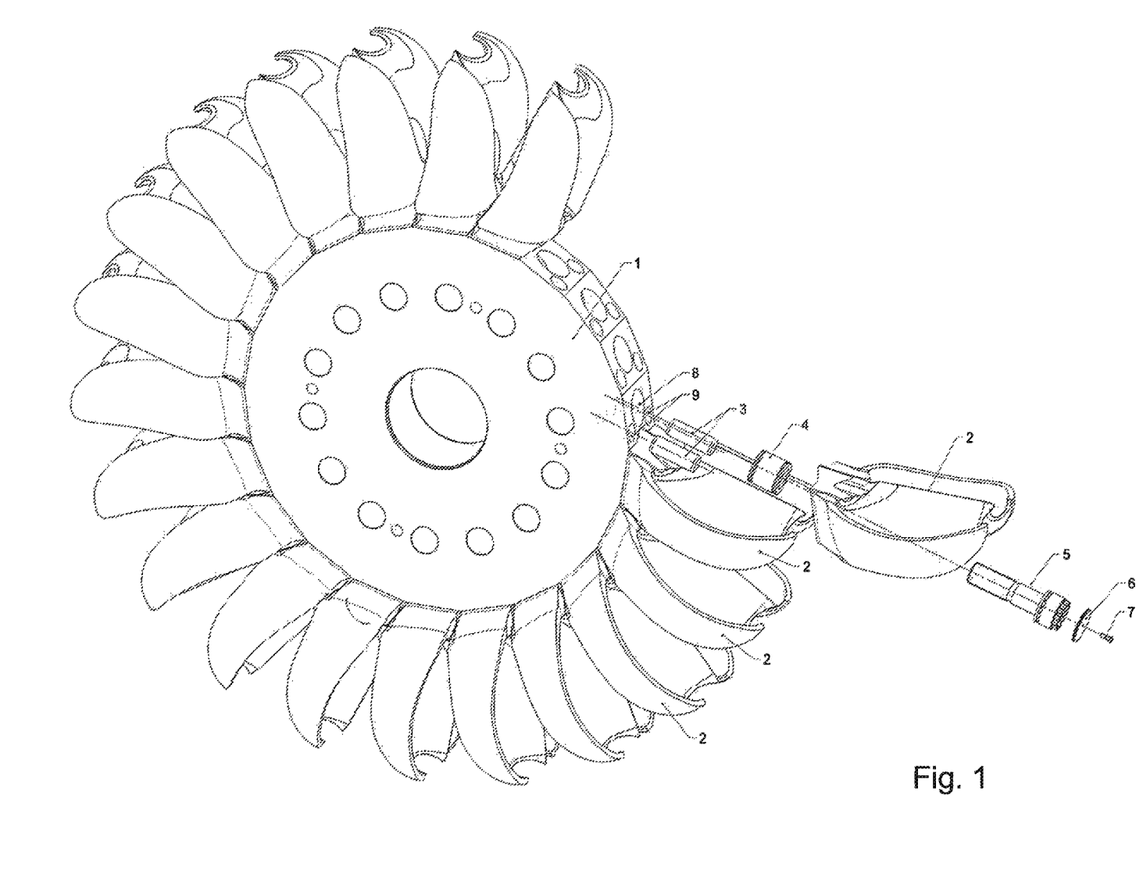
FIG. 1 shows a 3D illustration of a wheel disk with buckets mounted, as well as an exploded view of a bucket with fastening according to the invention.
Figure 5:
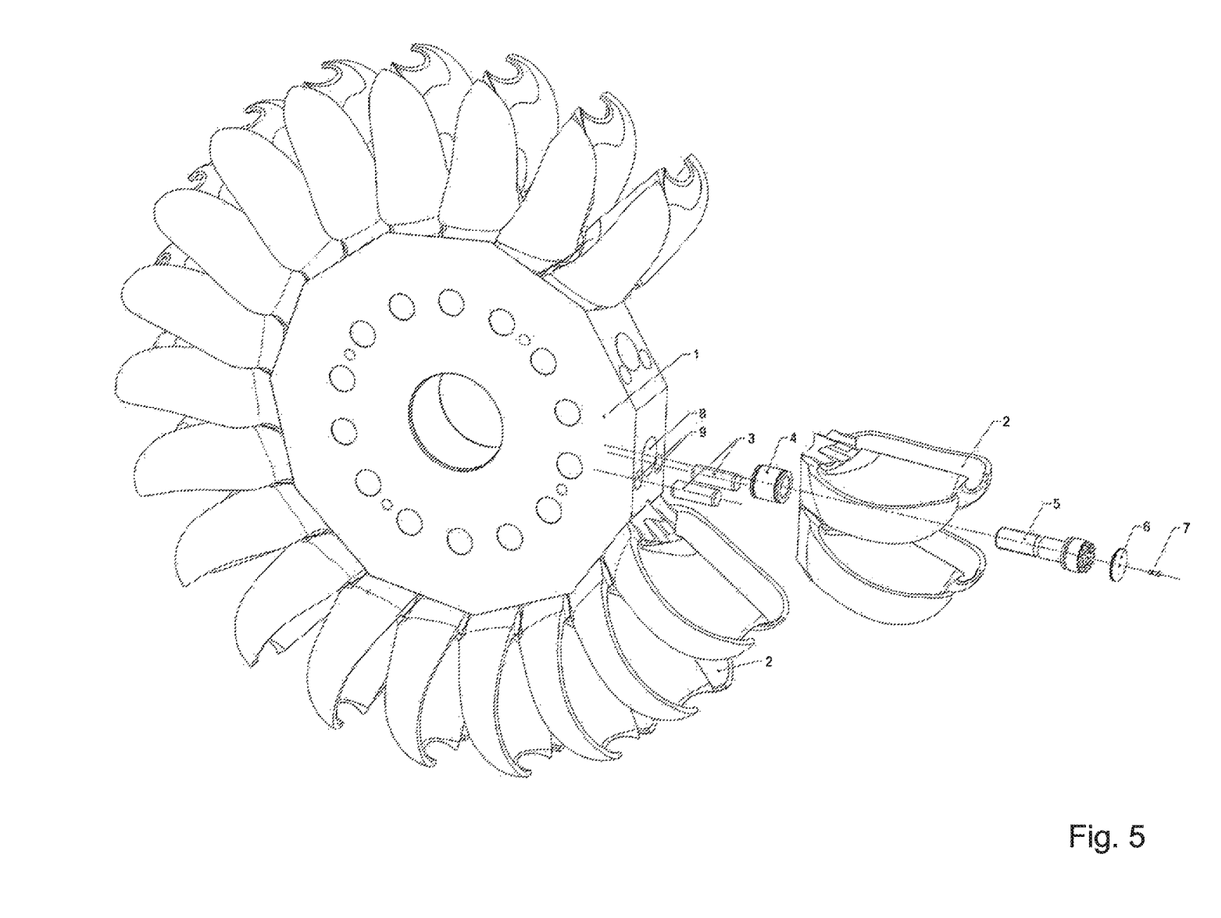
FIG. 5 shows a view of combined bucket units.

FIG. 1 shows a three dimensional (3D) illustration of a wheel disk 1 of a Pelton runner with buckets 2 mounted, as well as an exploded view of a bucket 2 with fastening according to the invention. The screw 5 is inserted through a corresponding bore hole in the bucket 2, surrounded by a bushing 4, and screwed with pre-stressing into a bore hole 8 in the wheel disk 1. The bushing may be a cylindrical sleeve through which extends the screw. The bushing 4 and screw 5 may be perpendicular to a rotational axis (FIG. 2) of the wheel disk 1. Further, the bushing and screw may be at an acute angle 11, such as 5 to 45 degrees, with respect to a radial line extending through the wheel disk from the rotational axis. Alternatively, the bushing and screw may be aligned with a radial line as shown in FIG. 5.

Shear pins 3 are inserted into corresponding holes 9 in the wheel disk 1 and corresponding bore holes in the bucket 2. There may be a pair of shear pins 3 on opposite sides of each expansion screw 5, along a direction parallel to the rotational axis 11. For example, the expansion screw 5 may be aligned with a center plane extending through the wheel disk 1, perpendicular to the rotational axis and equal distant from the front surface and rear surface of the wheel disk. Each shear pin 3 of the pair of shear pins may be offset from the center plane by an equal distance.

As in all Pelton turbines, the water is sprayed through nozzles onto the buckets 2. This water jet sprayed onto the buckets 2 is divided into two parts. Both parts of the water jet follow the course of the inner surface of the buckets 2 until the water leaves the bucket again. By changing the direction of the water jet, an impelling force is exerted on the bucket 2 and the runner.

This force is now transferred to the wheel disk 1 via the shear pins 3 and bushes 4. The pre-stressed expansion screws 5 largely bear the centrifugal forces of the Pelton buckets 2 caused by the rotating movement. A cover screw 7 connects the cover 6 to the expansion screw 5 to protect the latter against abrasive water. The cover may be a plate, such as a circular plate, affected to what would otherwise be an exposed end of the screw.

Figure 1A:
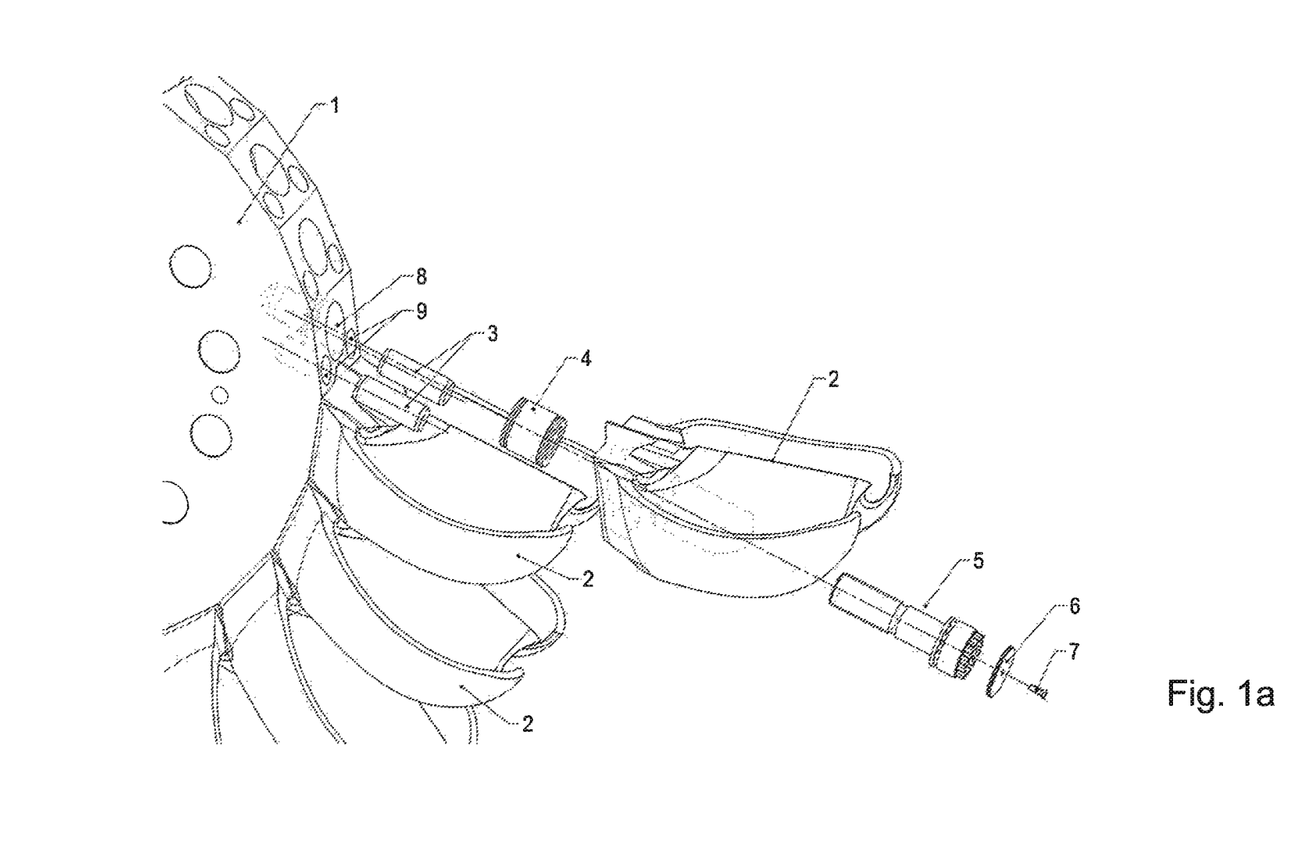
FIG. 1a shows an enlarged detail from FIG. 1.

FIG. 1a shows an enlarged detail from FIG. 1 in which part of the wheel disk 1, two buckets 2 and another bucket 2 with the screw 5, bushing 4, shear pin 3, and cover 6 with screw 7 as fasteners are visible.

Figure 2:
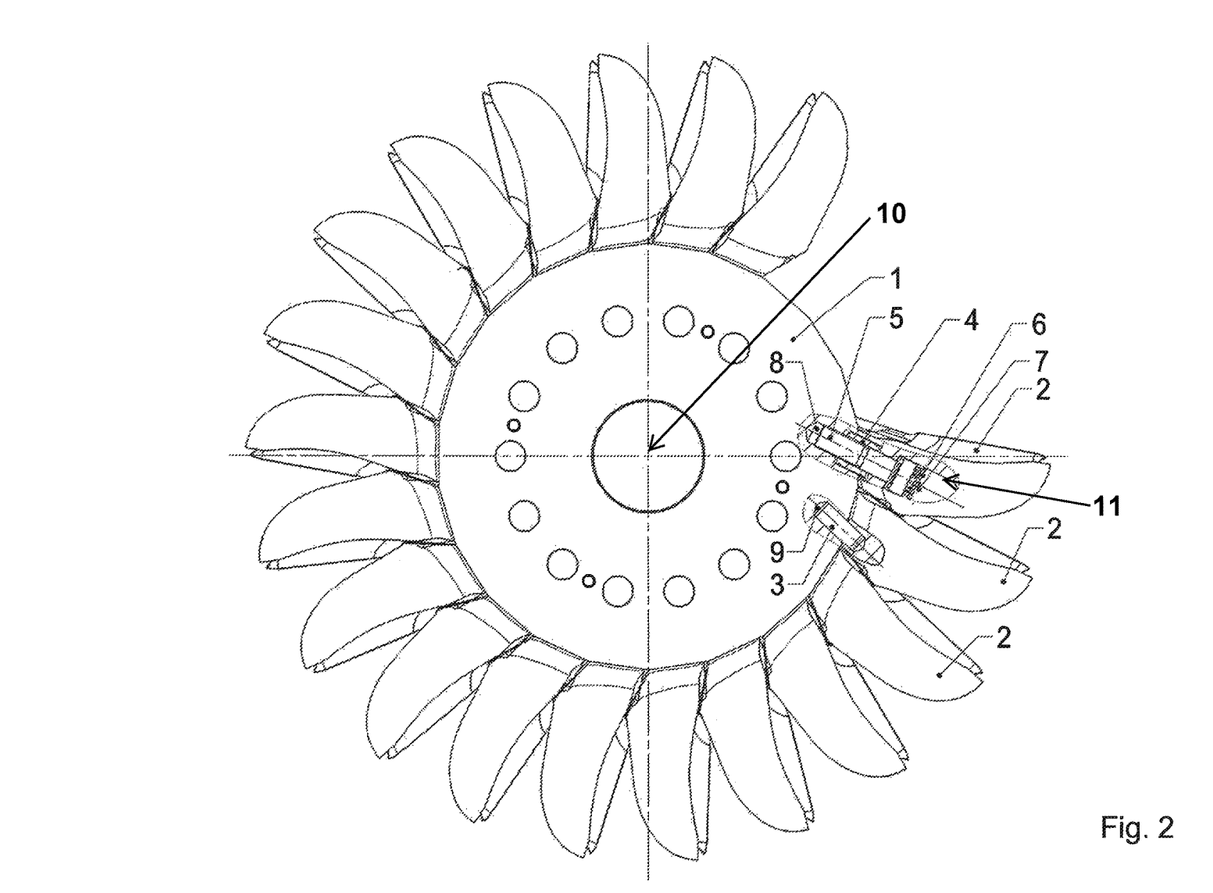
FIG. 2 shows a view of a wheel disk in axial direction with buckets mounted as well as sectional views in the area of the fastening.

FIG. 2 shows a view of a wheel disk 1 in axial direction with buckets 2 mounted as well as sectional views in the area of the fastening. Here, we can see the wheel disk 1, a number of buckets 2, and the screw 5 in the bore hole 8 with bushing 4 as well as cover 6 with screw 7 in the example of two buckets on different sectional planes. At another bucket 2, the sectional plane runs through the shear pin 3 and bore hole 9.

Figure 2A:
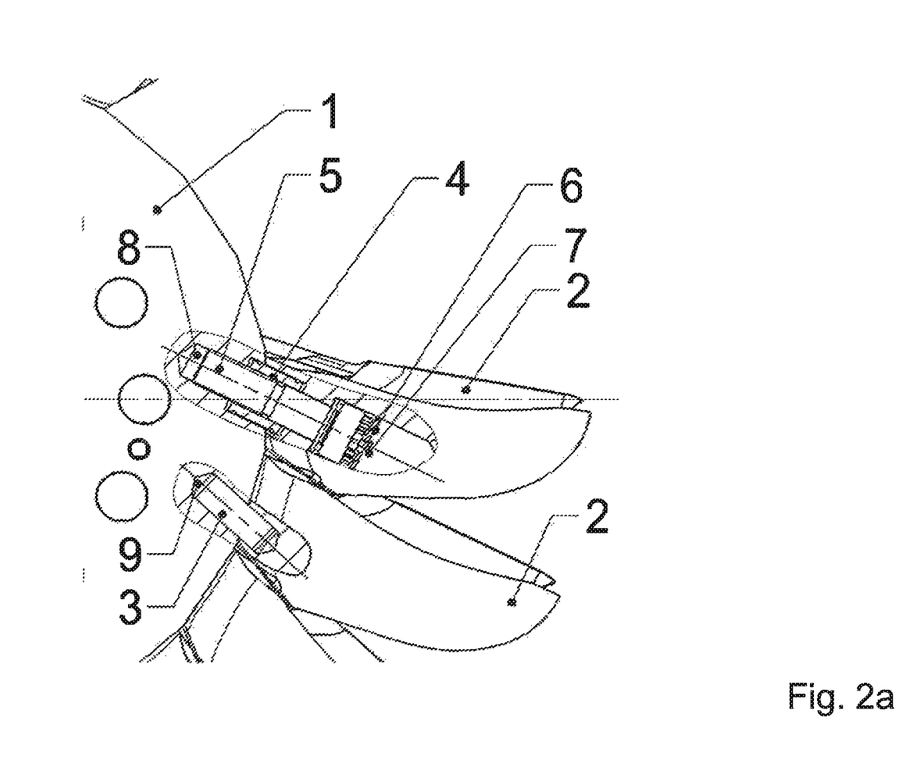
FIG. 2a shows an enlarged detail from FIG. 2.

The details are easier to see in FIG. 2a as an enlarged section from FIG. 2. Here we can also see that the bushing 4 is arranged between the screw 5 and the wheel disk 1 and bucket 2 and thus absorbs the shearing forces occurring at the contact surface between wheel disk 1 and bucket 2. By analogy, the shear pins 3 absorb the shearing forces between wheel disk 1 and bucket 2.

Figure 3:
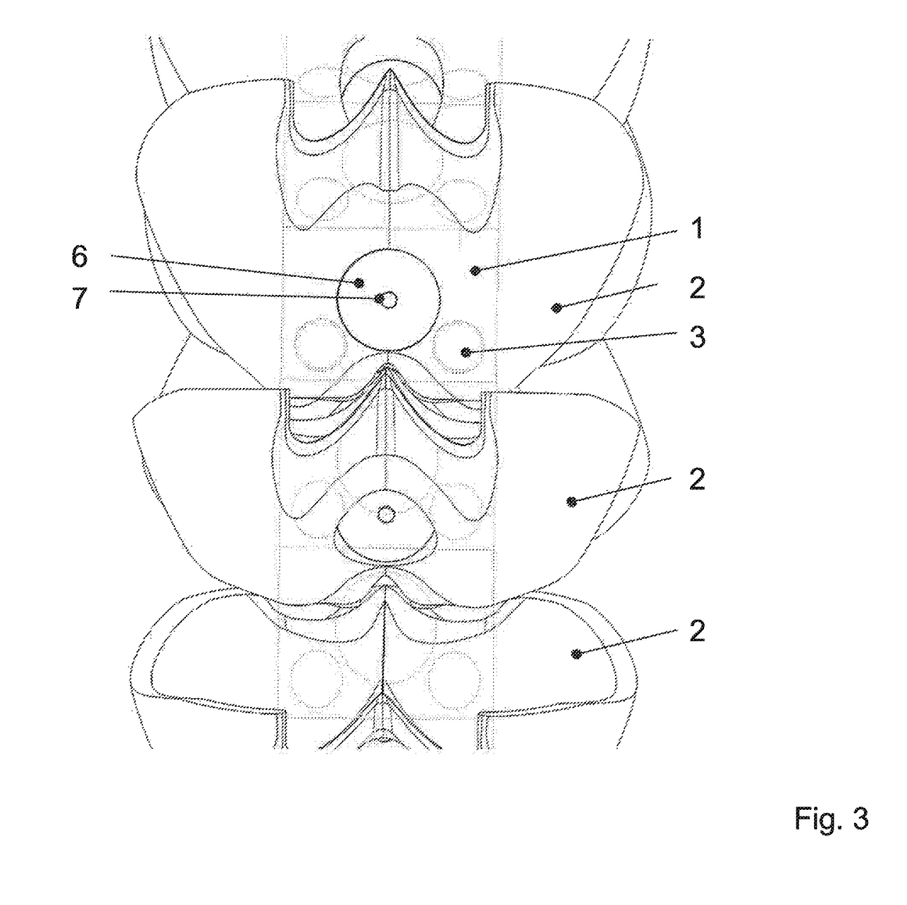
FIG. 3 shows a view of a detail from a wheel disk with buckets mounted in radial direction.

FIG. 3 shows a view of the buckets 2 in radial direction. At the complete bucket 2 at the top, we can see the two shear pins 3 as well as the cover 6 and the fastening screw 7 over the expansion screw 5 (not visible here). This arrangement is on the underside of the buckets 2.

With this form of fastening, it is also possible to replace individual buckets that have become worn due to abrasion without dismounting the other buckets. In addition, it is possible to replace the buckets easily and to use buckets with different geometries to meet changing hydraulic requirements. As there is no longer any need for the bucket extensions required previously because of the design and which were exposed to particularly high forces and abrasion at these points, sturdier buckets can be used. There is also no longer any need for repairs in areas exposed to greater forces.

Figure 4:
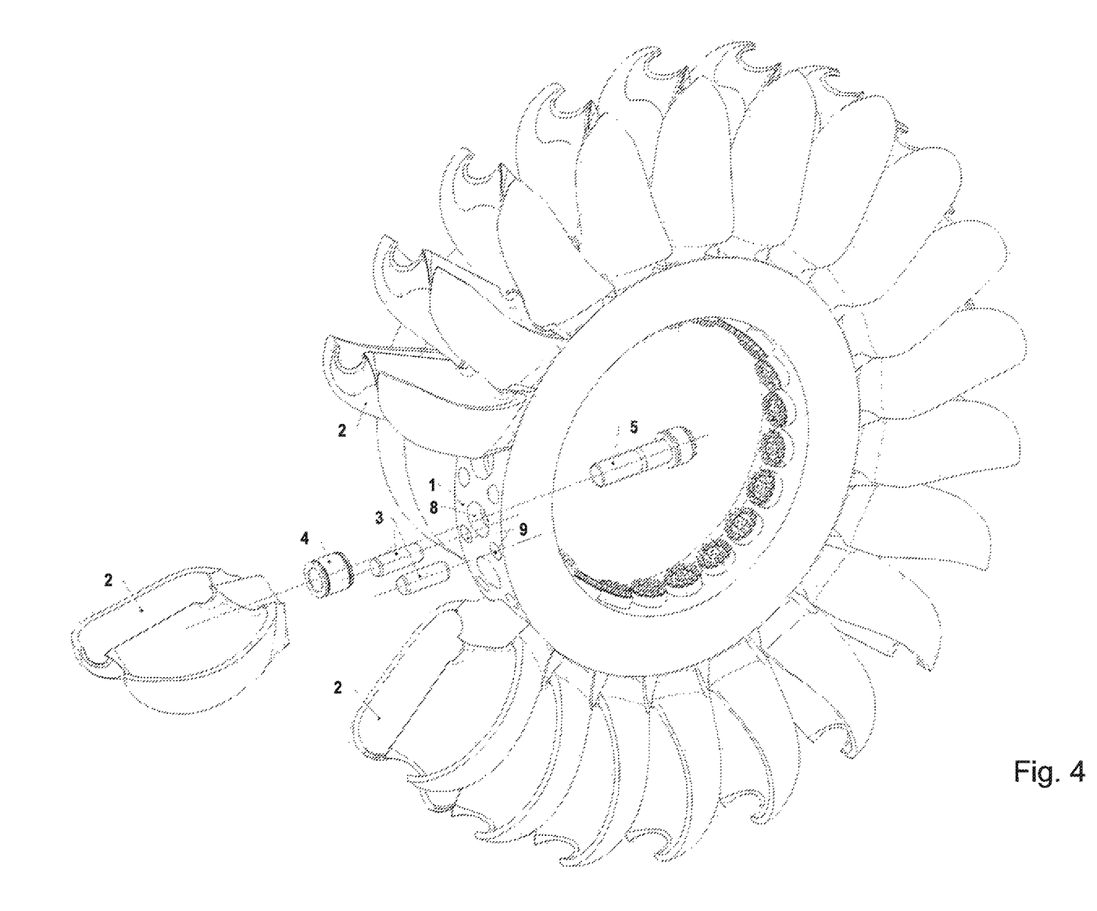
FIG. 4 shows a view of a screw joint variant from the inner side of the wheel disk.

FIG. 4 shows the design mentioned with a screw joint applied from the inner side of the wheel disk 1. The advantage of this variant is that there is no longer any need for the covers on the bucket side, and the screw joint can be protected and sealed off very easily against abrasive particles and water.

FIG. 5 shows a view of combined bucket units. Here, sets of two buckets are combined to form one bucket unit. These bucket units are each secured to the wheel disk 1 with only one expansion screw 5. This arrangement provides an alternative to the design explained above. This alternative combines the advantages described above with a shorter assembly time for bucket changing or remodelling to a different hydraulic bucket contour.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A Pelton runner including a wheel disk and separately manufactured buckets, wherein each of the buckets is cast or made from a solid block of material, secured detachably to the wheel disk, and fastened by at least one screw or at least one bolt to the wheel disk,
   wherein the at least one bolt or the at least one screw includes an shaft having a first end section with threads configured to engage a threaded surface in a hole in an outer surface of the wheel or in one of the buckets;
   wherein the shaft of at least one bolt or the at least one screw has a middle section that has a smaller outer diameter than an outer diameter of the first end section and a second end section of the shaft opposite to the first end section;
   wherein a cylindrical bushing is seated both in the hole of the annular wheel disk and the hole in the one of the buckets;
   wherein the shaft of the at least one bolt or the at least one screw extends through a passage in the cylindrical bushing and the middle section of the shaft is covered by the cylindrical bushing while the first and second end sections are outside of the cylindrical bushing;
   wherein the at least one screw or the at least one bolt is subjected to controlled pre-stressing, and
   wherein the at least one screw or the at least one bolt is arranged perpendicular to an axis of rotation of the wheel disk and secured to the wheel disk;
   wherein the at least one screw or the at least one bolt is aligned with a central plane that extends through the wheel disk, and is equally distant from a front surface and a rear surface of the wheel disk, and
   wherein, for each of the buckets, a pair of shear pins are on opposite sides of the at least one screw or the at least one bolt, extend into the bucket and the wheel disk, and are centered on a line perpendicular to the central plane and offset from the at least one screw or the at least one bolt.

2. The Pelton runner according to claim 1, further comprising a nut secured to an end of the at least one screw or the at least one bolt, wherein the end is opposite to the end section with the threads of the screw or the bolt, and
   wherein the nut is used to apply the controlled pre-stressing to the at least one screw or the at least one bolt.

3. The Pelton runner according to claim 1, wherein the shear pins are aligned in radial direction to the axis of rotation.

4. The Pelton runner according to claim 3, wherein the at least one screw or the at least one bolt directs radial centrifugal forces and the pair of shear pins direct tangential forces into the wheel disk.

5. The Pelton runner according claim 1, wherein the screw has a cover at a free end of the at least one screw or the at least one bolt, wherein the free end is opposite to the end section.

6. The Pelton runner according to claim 1, wherein two or more of the buckets are each combined to form one bucket unit and secured to the wheel disk by a single one of the at least one screw or at least one bolt.

7. The Pelton runner of claim 1, wherein an outer rim of the wheel disk has a planar region including the hole to receive the fastener, and holes to receive the shear pins.

8. A Pelton runner comprising:
a wheel disk having an outer surface facing radially outward,
buckets attached to the outer surface of the wheel disk;
a fastener attaching at least one of the buckets to the wheel disk, wherein the fastener includes a shaft having a first end section with threads which are configured to engage a threaded interior surface of a hole in the wheel disk or a hole in the attached bucket and a second end section opposite to the first end section and a middle section having an outer diameter smaller than outer diameters of the first and second end sections, wherein the fastener is oriented perpendicular to an axis of rotation of the wheel disk and the fastener is in a pre-stressed condition, wherein the fastener is aligned with a central plane, and the central plane extends through the wheel disk, is perpendicular to the axis of rotation, and is equally distant between a front surface and a rear surface of the wheel disk;
a cylindrical bushing seated in both the hole of the wheel disk and the hole in the at least one bucket, wherein the fastener extends through the bushing, and
shear pins on opposite sides of the fastener, and extending into the wheel disk and the bucket, wherein the shear pins are aligned centered on a line perpendicular to the central plane and offset from the fastener.

9. The Pelton runner of claim 8 wherein the fastener is a screw or a bolt.

10. The Pelton runner of claim 8 wherein each of the buckets is an integral, single piece component.

11. The Pelton runner of claim 8 wherein each of the buckets is a cast bucket.

12. The Pelton runner of claim 8 wherein each of the buckets is detachable from the wheel disk.

13. The Pelton runner of claim 8, wherein two or more of the buckets are combined to form a single bucket unit, and the single bucket unit is secured to the wheel disk by the fastener.

14. The Pelton runner of claim 8 wherein the fastener is oriented at an acute angle with respect to a radial line extending through the wheel disk and perpendicular to the axis of rotation.

15. The Pelton runner of claim 8, wherein an outer rim of the wheel disk has a planar region including the hole to receive the expansion screw or bolt, and holes to receive the shear pins.

* * * * *